US011738909B2

(12) United States Patent
Ichikawa et al.

(10) Patent No.: US 11,738,909 B2
(45) Date of Patent: Aug. 29, 2023

(54) SLEEVE AND PACKAGING BAG

(71) Applicant: HOSOKAWA YOKO CO., LTD., Tokyo (JP)

(72) Inventors: Toru Ichikawa, Misato (JP); Kenji Nagata, Nagareyama (JP)

(73) Assignee: HOSOKAWA YOKO CO., LTD, Tokyo (JP)

( * ) Notice: Subject to any disclaimer, the term of this patent is extended or adjusted under 35 U.S.C. 154(b) by 118 days.

(21) Appl. No.: 16/977,112

(22) PCT Filed: Mar. 4, 2019

(86) PCT No.: PCT/JP2019/008354
§ 371 (c)(1),
(2) Date: Sep. 1, 2020

(87) PCT Pub. No.: WO2019/172177
PCT Pub. Date: Sep. 12, 2019

(65) Prior Publication Data
US 2020/0407119 A1    Dec. 31, 2020

(30) Foreign Application Priority Data
Mar. 5, 2018    (JP) .................................. 2018-038827

(51) Int. Cl.
*B65D 33/02*    (2006.01)
*B65D 75/00*    (2006.01)
(Continued)

(52) U.S. Cl.
CPC ........... *B65D 33/02* (2013.01); *B65D 75/008* (2013.01); *C08K 3/26* (2013.01); *C08K 3/346* (2013.01);
(Continued)

(58) Field of Classification Search
CPC .............................. B65D 33/02; B65D 75/008
(Continued)

(56) References Cited

U.S. PATENT DOCUMENTS 3,249,286 A * 5/1966 Palmer ................... B65D 33/02
383/119
5,205,651 A * 4/1993 Decottignies ........ B65D 75/008
229/87.01
(Continued)

FOREIGN PATENT DOCUMENTS

CN    1911742    2/2007
DE    2003088    8/1971
(Continued)

OTHER PUBLICATIONS

Machine translation of JP 2010-280098 A.*
(Continued)

*Primary Examiner* — Jes F Pascua
(74) *Attorney, Agent, or Firm* — Nixon Peabody LLP; Jeffrey L. Costellia (57) ABSTRACT

A sleeve (10) is for being provided in a bag body (20) to come into contact with an inner face of the bag body (20) in a tubular state and imparting a three-dimensional shape to the bag body (20), and comprises polyolefin and a filler. The packaging bag (1) includes a bag body (20) and a sleeve (10) provided in the bag body (20), and is capable of self-standing.

6 Claims, 8 Drawing Sheets

(51) Int. Cl.
  *C08K 3/26* (2006.01)
  *C08K 3/34* (2006.01)
  *C08L 23/06* (2006.01)
  *C08L 23/12* (2006.01)

(52) U.S. Cl.
  CPC ........ *C08K 2003/265* (2013.01); *C08L 23/06* (2013.01); *C08L 23/12* (2013.01)

(58) Field of Classification Search
  USPC .................................................. 383/104, 119
  See application file for complete search history.

(56) References Cited

U.S. PATENT DOCUMENTS

| | | | | |
|---|---|---|---|---|
| 6,132,351 | A * | 10/2000 | Lotto | B65D 33/02 493/379 |
| 6,908,422 | B2 * | 6/2005 | Ichikawa | B65D 33/2508 53/139.2 |
| 7,510,515 | B2 * | 3/2009 | Ichikawa | B31B 70/008 493/193 |
| 2001/0029226 | A1 | 10/2001 | Ichikawa et al. | |
| 2002/0076471 | A1 * | 6/2002 | Olsson | B65D 75/566 383/122 |
| 2004/0101216 | A1 * | 5/2004 | Ichikawa | B65B 29/028 383/119 |
| 2005/0053315 | A1 * | 3/2005 | Aasen | B65D 33/02 383/122 |
| 2008/0031553 | A1 * | 2/2008 | Tokita | B65D 81/264 383/113 |
| 2009/0045210 | A1 * | 2/2009 | Tilton | B32B 5/30 264/339 |

FOREIGN PATENT DOCUMENTS

| | | |
|---|---|---|
| EP | 0 155 035 | 9/1985 |
| EP | 1 424 290 | 6/2004 |
| JP | 63-232148 | 9/1988 |
| JP | 2001-322187 | 11/2001 |
| JP | 2004-175408 | 6/2004 |
| JP | 2007-119076 | 5/2007 |
| JP | 2008105733 A * | 5/2008 |
| JP | 2010-280098 | 12/2010 |
| JP | 2015-000747 | 1/2015 |
| JP | 2016-145059 | 8/2016 |
| JP | 2017-104485 | 6/2017 |
| RU | 2 276 847 | 5/2006 |

OTHER PUBLICATIONS

Chinese Office Action for Chinese App. No. 201980016763.6, dated Aug. 24, 2021 (8 pages).
Extended European Search Report (Application No. 19765058.3) dated Nov. 5, 2021, 6 pages.
International Search Report for PCT/JP2019/008354, dated May 28, 2019.
Indian Office Action for App. No. 202047037026, dated Mar. 23, 2022 (6 pages).

* cited by examiner

SLEEVE AND PACKAGING BAG

TECHNICAL FIELD

The present invention relates to a sleeve and a packaging bag.

Priority is claimed on Japanese Patent Application No. 2018-038827, filed Mar. 5, 2018, the content of which is incorporated herein by reference.

BACKGROUND ART

As a packaging bag which accommodates tea bags and the like, a packaging body in which a rectangular tubular sleeve is provided inside a bag body formed of a film material to impart a three-dimensional shape is known. The sleeve before use of the packaging bag is bonded to an inner face of the bag body in a flat state. At the time of use, the sleeve is folded into a tubular shape, and an excess portion of the bag body is folded in accordance with the shape of the sleeve. As a result, the packaging bag has a box-like three-dimensional shape, and a self-standing property and a stacking property of being stackable are imparted.

As the sleeve, a sleeve made of foldable paper or synthetic resin has been proposed (for example, see Patent Document 1). Further, a plastic sleeve using a polyethylene film as a synthetic resin has also been proposed (for example, see Patent Document 2).

CITATION LIST

Patent Document

[Patent Document 1]
  Japanese Unexamined Patent Application, First Publication No. 2001-322187
[Patent Document 2]
  Japanese Unexamined Patent Application, First Publication No. 2004-175408

SUMMARY OF INVENTION

Technical Problem

A sleeved packaging bag that uses a paper sleeve has the problem that wrinkles may be generated in a film material depending on the storage states and the appearance may deteriorate. This problem is related to properties in which the paper sleeve expands when absorbing moisture and contracts when drying. This problem occurs in a sleeved packaging bag that uses a paper sleeve, because there is a difference between an amount of dimensional change caused by variations in the moisture content of the paper sleeve due to seasonal differences and an amount of dimensional change of the film material. Therefore, in order to reduce wrinkling of the packaging bag, it is necessary to control the humidity of the paper sleeve or the packaging bag when stored. Wrinkling of a sleeved packaging bag using a paper sleeve may also be caused, depending on the amount of water in the contents to be packaged. In particular, in a planar part which is also a feature of a packaging bag in which a three-dimensional shape is imparted as a rectangular parallelepiped shape by the sleeve, there is a problem that, when wrinkles are generated, they are highly conspicuous and the appearance deteriorates. Furthermore, the planar part often forms the front design of the packaging bag, which may impair the product value when the product is displayed.

Also, since a paper sleeve has lower water resistance and oil resistance than a plastic sleeve, there is a likelihood that moisture or oil contained in the contents will be absorbed by the paper sleeve and that the contents will deteriorate. When moisture or oil contained in the contents is absorbed and partial discoloration occurs in the paper sleeve, since the discoloration can be seen through the film material, there is also a likelihood that the appearance will deteriorate and the commercial value will be degraded. For these reasons, paper sleeves have limited applications in packaging bags.

Furthermore, when the paper sleeve is discarded, the paper fibers easily remain on the bag body side, which also causes a problem for separate disposal.

A plastic sleeve does not cause wrinkles when used and has excellent water resistance and oil resistance. Because its material is the same as that of a film material, there is no problem of separate disposal thereof. However, since a plastic sleeve is inferior in rigidity and holding properties to a paper sleeve, it is difficult to impart a firm three-dimensional shape to the bag body to ensure a self-standing property and a stacking property with the same thickness as a paper sleeve. Therefore, the thickness of a plastic sleeve needs to be thicker than a paper sleeve. However, when trying to increase the thickness and ensure sufficient rigidity with a plastic sleeve, since the dead-holding property deteriorates and the rectangular tubular three-dimensional shape approaches a round tubular shape, it is difficult to stack adjacent packaging bags closely and orderly, and stacking properties deteriorate.

Also, when a plastic sleeve is heat-sealed to the inner face of a bag body that uses the same type of resin as a plastic sleeve for the inner face of the film material, the film material and the plastic sleeve are firmly bonded. As a result, when it is required to separately discard the film material and the plastic sleeve, they cannot be easily peeled off from each other, which may hinder the separate disposal.

An object of the present invention is to provide a sleeve that has excellent water resistance and oil resistance, is capable of ensuring sufficient rigidity and dead-holding property even when the thickness is not excessively thickened, has excellent appearance, and can be easily peeled off from a hag body after use, and a packaging bag using the sleeve.

Solution to Problem

The present invention has the following configurations.

A sleeve according to a first aspect of the present invention is for being provided inside a bag body to come into contact with an inner face of the bag body in a tubular state, and for imparting a three-dimensional shape to the bag body, and contains a polyolefin and a filler.

According to the sleeve of a second aspect of the present invention, a content of the filler may be 20% by mass or more, based on a total mass of the sleeve.

According to the sleeve of a third aspect of the present invention, a first crease configured to assist in folding the sleeve into a rectangular tubular shape may be formed on a sleeve surface.

According to the sleeve of a fourth aspect of the present invention, the filler may be calcium carbonate or talc.

A packaging bag according to a fifth aspect of the present invention includes a bag body, and the sleeve according to of the first aspect to the fourth aspect provided in the bag body.

In the packaging bag according to a sixth aspect of the present invention, the sleeve may have a tubular shape, a three-dimensional shape may be imparted to the bag body, and the bag body may be self-standing and stackable.

In the packaging bag according to a seventh aspect of the present invention, a bonding part configured to bond the sleeve to an inner face of the bag body may be provided at a portion other than a portion along a first crease which assists in folding the sleeve into a rectangular tubular shape, and the sleeve and the bag body may be bonded by the bonding part.

In the packaging bag according to an eighth aspect of the present invention, the bonding part may be provided along a second crease which assists in folding the sleeve into a flat shape at each of positions sandwiching the second crease.

Advantageous Effects of Invention

The sleeve of the present invention is used for a packaging bag, has excellent water resistance and oil resistance, is capable of ensuring sufficient rigidity and dead-holding property even when the thickness is not excessively thickened, can suppress appearance deterioration of the packaging bag, and can be easily peeled off from a bag body after use.

The packaging bag of the present invention has sufficient self-standing properties and stacking properties, and has an excellent appearance. The sleeve can be easily peeled off from the bag body after use.

DESCRIPTION OF EMBODIMENTS

[Sleeve]

A sleeve of the present invention is provided inside a bag body to be in contact with the inner face of the bag body in a tubular state, thereby giving a three-dimensional shape to the bag body, and the sleeve of the present invention contains a polyolefin and a filler. By using the sleeve of the present invention, it is possible to impart a three-dimensional shape to the packaging bag so that the packaging bag can stand by itself and is stackable.

Hereinafter, an example of the sleeve of the present invention will be described on the basis of FIGS. 1 and 2.

The dimensions and the like of the drawings shown as an example in the following description are examples, and the present invention is not necessarily limited to these, and can be implemented by appropriately changing within the scope without changing the spirit thereof.

The sleeve 10 of the present embodiment s made up of a long rectangular plate-shaped sheet 10A, and the thickness of the sleeve 10 is thicker than a film material forming a bag body. In the sleeve 10, both end portions 10a and 10b of the plate-shaped sheet 10A in the lengthwise direction are bonded to each other to have a tubular shape. The end portion 10a and the end portion 10b of the plate-shaped sheet 10A in the lengthwise direction are stacked and bonded so that the end portion 10b is located inside the end portion 10a.

A method for bonding the one end portion 10a and the other end portion 10b of the plate-shaped sheet 10A is not particularly limited, and examples thereof include a method for welding by heat sealing, a method for bonding with an adhesive and the like.

The form of the sleeve is not limited to a form in which both end portions of the plate-shaped sheet in the lengthwise direction are bonded to each other. For example, the sleeve may have a form in which the two end portions of the plate-shaped sheet in the lengthwise direction are made to abut each other and the end portions are not bonded to each other. In this way, even with the sleeve in which the abutted end portions are not bonded to each other, if the sleeve is bonded to the inner face of the bag body, a three-dimensional shape can be imparted to the bag body. At this time, bonding-scheduled parts 14a and 14b bonded to the sleeve and the bag body are shown in FIG. 1. In the present embodiment, the bonding-scheduled parts 14a and 14b are provided along a crease 12a at positions sandwiching the crease 12a. Similarly, the bonding-scheduled parts 14a and 14b are provided along the crease 12b at positions sandwiching the crease 12b. As will be described later, the bonding-scheduled parts 14a and 14b become the bonding parts 14A and 14B after being bonded to the bag body.

Four creases (first creases) 11a to 11d for assisting in folding of the sleeve 10 into a rectangular tubular shape are formed on the outer surface 10c of the sleeve 10. The four creases 11a to 11d are formed at intervals in the lengthwise direction of the plate-shaped sheet 10A, that is, a circumferential direction of the sleeve 10. The four creases 11a to 11d are linearly formed to extend along a width direction of the plate-shaped sheet 10A, that is, a height direction of the sleeve 10 when the packaging bag is self-standing.

Further, the crease is a fold for bending the sleeve into a tubular shape and is also called a crease.

Also, two creases (second creases) 12a and 12b are formed on the surface 10c of the sleeve 10. The creases 12a and 12b assist in folding of the sleeve 10 into a flat shape. The crease 12a is formed in a linear shapes to extend along the width direction of the plate-shaped sheet 10A, that is, the height direction of the sleeve 10, between two adjacent creases 11a and 11b on the outer surface 10c of the sleeve 10. The crease 12b is formed in a linear shape to extend along the width direction of the plate-shaped sheet 10A, that is, the height direction of the sleeve 10, between two other adjacent creases 11c and 11d on the surface 10c of the sleeve 10. The crease 12a and the crease 12b are formed at positions facing each other when the sleeve 10 is formed in a rectangular tubular shape.

Figure 1:
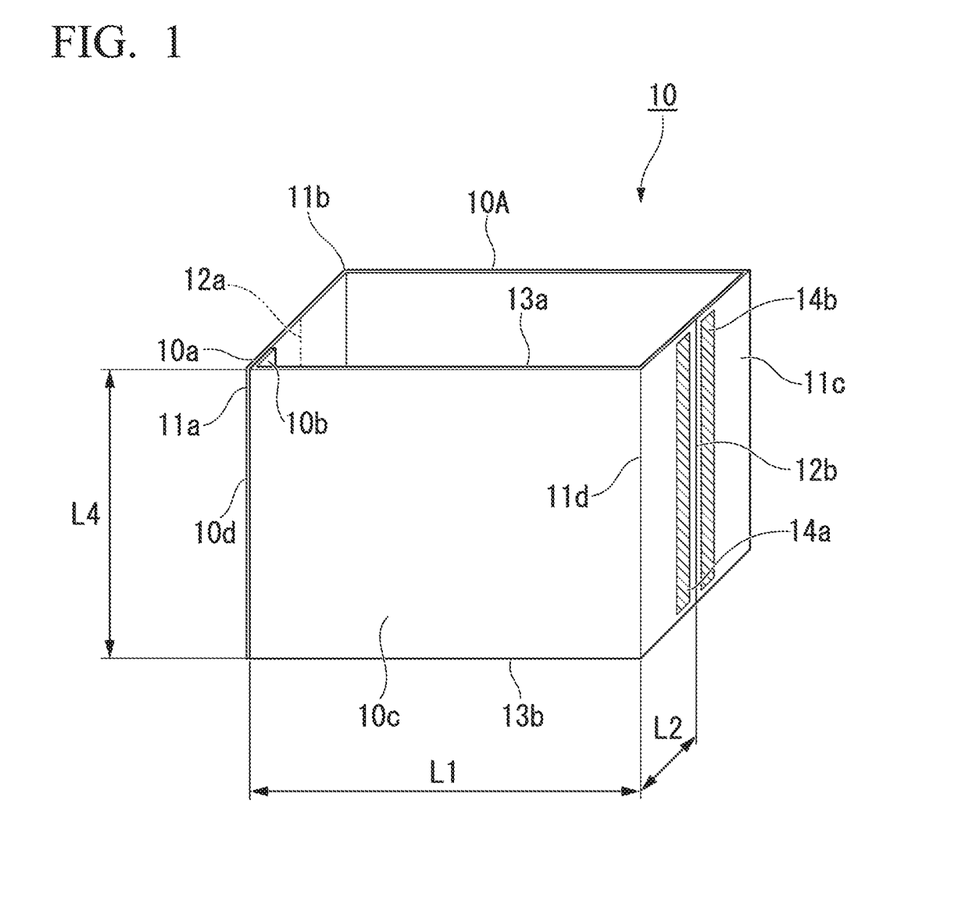
FIG. 1 is a perspective view showing an example of a tubular state of a sleeve of the present invention.
Figure 2:
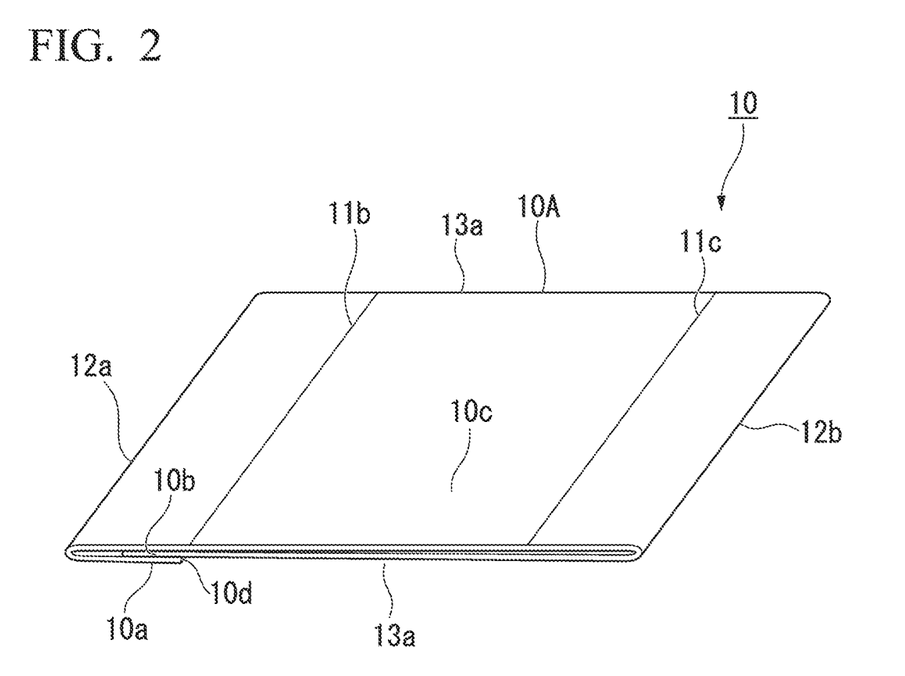
FIG. 2 is a perspective view showing the sleeve of FIG. 1 in a flat state.

As shown in FIG. 1, the sleeve 10 can be formed into a rectangular tubular shape by folding at right angles with four creases 11a to 11d as boundaries. Further, the sleeve 10 can be made to have a flat shape, by folding by the use of two creases 12a and 12b as shown in FIG. 2. In this way, the sleeve 10 is configured to be foldable.

In the sleeve 10, an edge 10d of the end portion 10a located on the outer side of the end portion 10b is formed along the crease 11a, in a portion in which both end portions 10a and 10b of the plate-shaped sheet 10A in the lengthwise direction overlap and are bonded to each other. Therefore, in a state in which the sleeve 10 has a rectangular tubular shape, the edge 10d of the end portion 10a that overlaps the outside of the end portion 10b in the plate-shaped sheet 10A coincides with the corner of the rectangular tube. As a result, when the sleeve 10 is bonded to the inner face of the bag body to be formed in a rectangular tubular shape, a step difference of the portion, in which the edge 10d of the end portion 10a that overlaps the outside of end portion 10b of the plate-shaped sheet 10A is located, coincides with the corner of the bag body. Thereby, the step difference is not conspicuous and the aesthetic appearance of the product is enhanced.

Further, in the sleeve of the present invention, the shape when the sleeve has a tubular shape is not limited to a rectangular tubular shape, and may be, for example, a polygonal tubular shape, such as a hexagonal tubular shape, other than a rectangular tubular shape, and may be a cylindrical shape or the like.

Each crease is made up of a groove. A cross-sectional shape perpendicular to the lengthwise direction of each crease is not particularly limited, and examples thereof include a rectangular shape, a triangular shape, a semicircular shape and the like.

A method for forming the crease is not particularly limited, and examples thereof include a method for pressing a cutting edge.

The sleeve 10 contains a polyolefin and a filler. That is, the sleeve 10 is formed by a plate-shaped sheet 10A containing a polyolefin and a filler.

Since the sleeve 10 is made of plastic containing polyolefin, the sleeve 10 has water resistance and oil resistance superior to a paper sleeve. As a result, since hardly any moisture or oil contained in contents is absorbed by the sleeve 10, deterioration of the contents can be curbed, and the sleeve 10 does not discolor, the sleeve 10 can be used in a wide range of applications. Further, although the dimensions of the paper sleeve change due to the influence of humidity, the sleeve 10 of the present invention is not influenced by humidity during storage and does not change in dimensions. Therefore, when formed into a tubular shape in the bag body, since the film material of the bag body located outside the sleeve 10 can be pulled and tensioned as designed, a packaging bag having a flat face and excellent appearance can be obtained.

Further, since the sleeve 10 is made of a lightweight plastic containing polyolefin, energy consumption and greenhouse gas emission in a life cycle from the time when the packaging bag is manufactured to the rime when it is used and finally discarded are also reduced as compared with the paper sleeve.

Examples of polyolefin include, but are not particularly limited, for example, polyethylene-based resins, such as polyethylene (PE) such as high-density polyethylene (HDPE), medium-density polyethylene (MDPE), low-density polyethylene (LDPE) and linear low-density polyethylene (LLDPE), and ethylene-vinyl acetate copolymers; polypropylene-based resins such as polypropylene (PP), ethylene-propylene copolymers and α-olefin-propylene copolymers; and cyclic polyolefin resins.

The polyolefin contained in the sleeve 10 is preferably the same as the polyolefin contained in a heat-sealing layer of the bag body, which will be described later.

The polyolefin contained in the sleeve 10 may be only one type, or two or more types mixed depending on the application.

As the polyolefin used for the sleeve 10, PP and PE are preferable from the viewpoint of easy heat sealability to the bag body.

Since the sleeve 10 contains a filler, the sleeve 10 has sufficient rigidity and also has excellent holding properties even though the sleeve 10 is made of plastic. Further, since the filler does not have a heat-sealing property and acts as a heat-sealing inhibitor, it is possible to prevent the heat-sealing properties of the sleeve 10 with respect to the bag body from becoming excessively strong. Therefore, when the sleeve 10 is separated from the bag body and discarded after the use of the packaging bag, the sleeve 10 can be easily peeled off from the bag body, and the trajectory of peeling is esthetically pleasing. Therefore, since it is possible to cope with both a local government in which the bag body and the plastic sleeve can be discarded collectively, and a local government in which these cannot be discarded collectively and separation is required, it is easy to cope with regulations regarding different disposal for respective local governments.

The filler contained in the sleeve 10 is not particularly limited, and examples thereof include inorganic fillers such as talc, calcium carbonate, magnesium carbonate, calcium silicate, magnesium silicate, calcium oxide, and magnesium oxide. Among them, talc and calcium carbonate are preferable.

The filler contained in the sleeve 10 may be one or more types.

The sleeve 10 may contain components other than polyolefin and the filler, in addition to polyolefin and the filler. Examples of other components include resins other than polyolefin, various additives, and the like.

Examples of additives include pigments, slip agents, antioxidants and the like.

Examples of pigments include titanium oxide, carbon black and the like. The sleeve can be made to have any color by adding pigments to the sleeve.

As the slip agent, a slip agent normally used for polyolefin packaging can be used. Examples thereof include oleic acid amides, erucic acid amities, stearic acid amides, behenic acid amides, N-stearylerucic acid amides, ethylenebisoleic acid amides and the like.

Examples of antioxidants include phenolic antioxidants, phosphorus antioxidants and the like. They may be used alone or in combination of two types.

The plate-shaped sheet 10A that forms the sleeve 10 may have a single-layer structure or a multi-layer structure. In the case of multiple layers, a layer having at least the surface of the sleeve 10 bonded to the film material is defined as a plate-shaped sheet 10A that is a layer containing polyolefin and a filler. Specific examples of the multi-layer structure include a two-layer structure of a polyolefin layer containing a filler and a polyolefin layer containing no filler, and a three-layer structure having an intermediate layer. In the case of a three-layer structure, by forming the intermediate layer with a resin containing an oxygen-absorbing material, it is possible to impart a function of preventing oxidation of the contents during the storage period after filling the bag with contents. Further, in the case of the three-layer structure, the intermediate layer is colored in a dark color such as black or gray, and the layers on both sides of the intermediate layer are colored in white. Thus, it is possible to shield with the dark color tone of the intermediate layer and to suppress deterioration such as fading of contents due to light radiation.

The content of polyolefin in the sleeve 10 is preferably 25% by mass or more and 80% by mass or less, and more preferably 30% by mass or more and 70% by mass or less, based on the total mass of the sleeve 10. If the content of polyolefin is equal to or greater than a lower limit value of the aforementioned range, it is easy to obtain a packaging bag in which the water resistance and oil resistance are good, dimensional changes become small, the film material of the bag body is easily tensioned, and the appearance is good. When the content of polyolefin is equal to or less than the upper limit value of the aforementioned range, the content of the filler can be relatively increased, and various effects due to the addition of the filler can be easily obtained.

When polyolefin contains PE and PP, a mass ratio of PE to PP is preferably 0.05 or more and 19 or less, and more preferably 0.1 or more and 9 or less. If the mass ratio is within this range, the dead-holding property becomes good.

The content of the filler in the sleeve 10 is preferably 20% by mass or more, more preferably 20% by mass or more and 75% by mass or less, and further preferably 30% by mass or more and 70% by mass or less, based on the total mass of the sleeve 10. When the content of the filler is equal to or more than the lower limit value of the aforementioned range, a sleeve which is excellent in rigidity and dead-holding property can be easily obtained, and the sleeve can be more easily peeled off from the bag body. If the content of the filler is equal to or less than the upper limit value of the aforementioned range, the content of polyolefin can be relatively increased, and the effect of polyolefin can be easily obtained.

The thickness of the sleeve 10 is preferably 150 μm or more and 1000 μm or less, and more preferably 200 or more and 500 μm or less. If the thickness of the sleeve 10 is equal to or more than the lower limit value of the aforementioned range, sufficient rigidity and dead-holding property are easily obtained. If the thickness of the sleeve 10 is made equal to or less than the upper limit values of the aforementioned ranges, since the packaging bag is unlikely to become bulky, the number of packaging bags that can be accommodated in an outer container such as a cardboard box increases, and an outer container in which a predetermined number of packaging bags are packed can be made smaller. Therefore, the transportation efficiency can be improved.

The method for manufacturing the sleeve 10 is not particularly limited. Examples of the method for forming the plate-shaped sheet forming the sleeve include a method for performing extrusion molding using a resin composition in which a polyolefin and a filler are mixed with other components used as necessary.

Although it was explained that the sleeve is made of a normal plate-shaped sheet in the aforementioned explanation, a window part may be formed on the planar part of the sleeve if necessary. The window part may be formed in a portion of the planar part of the sleeve corresponding to the front and rear faces of the packaging bag, or may be formed in a portion of the planar part of the sleeve corresponding to the side face of the packaging bag. By forming the window part on the planar part of the sleeve, the contents can be visually recognized from the outside through the window part of the bag body.

When performing printing on a base material layer of the bag body in an aspect in which the window part is formed on the planar part of the sleeve, it is preferable to provide a design in which the portion of the base material layer corresponding to the window is not printed on so that the contents can be visually recognized. When performing printing on the portion corresponding to the window, it is preferable to consider the design so that the contents can be visually recognized.

If the window part is provided, there is a likelihood that problems such as fading of contents due to light rays may occur. In such a case, by adopting at least one of the following two points, it is possible to prevent the occurrence of problems such as fading of the contents due to light rays.

1) A film that shields ultraviolet rays is used as one of the layers constituting the laminate (a base material layer, or an intermediate layer to be stacked if necessary).

2) A coating layer that shields ultraviolet rays is provided on the base material layer, or the intermediate layer to be stacked as necessary.

As described above, the sleeve of the present invention contains polyolefin and the filler. Therefore, since the water resistance and the oil resistance are improved as compared with the paper sleeve, and it is hard to absorb the moisture or the oil contained in the content, the sleeve of the present invention can be used for a packaging bag for a wide range of applications.

Also, dimensional changes due to external factors such as moisture are smaller than in a paper sleeve. Therefore, when the sleeve is formed into a tubular shape, since the film material of the bag body can be pulled and tensioned as designed, a packaging bag having a flat face and excellent appearance without wrinkles can be obtained. Mon specifically, the paper sleeve easily expands in a high humidity environment and easily contracts in a low humidity environment in contrast to the film material of the bag body. Therefore, the film material of the hag body may become wrinkled to impair the aesthetic appearance and deteriorate the appearance. However, the sleeve of the present invention does not expand or contract due to humidity change and does not generate wrinkling in the film material.

Also, since the sleeve contains a filler, sufficient rigidity resilience) and dead-holding property are ensured even when the sleeve is not made to be excessively thick. Therefore, the three-dimensional shape of the packaging bag can be stably maintained without impairing the transportation efficiency. Further, since the filler contained in the sleeve acts as a heat seal inhibitor, the sleeve can be easily peeled off from the bag body after use.

In this way, the sleeve of the present invention combines water resistance, oil resistance, beauty, rigidity, dead-holding property, and peelability from the bag body, by combining polyolefin and the filler.

[Packing Bag]

The packaging bag of the present invention includes a bag body and a sleeve of the present invention provided in the bag body. The packaging bag of the present invention can have a three-dimensional shape due to the sleeve of the present invention, and can be made self-standing and stackable. The packaging bag of the present invention can adopt the same aspect as a known packaging bag using a sleeve, except that the sleeve of the present invention is provided as the sleeve.

Hereinafter, an example of the packaging bag of the present invention will be described on the basis of FIGS. 3 to 8.

Figure 3:
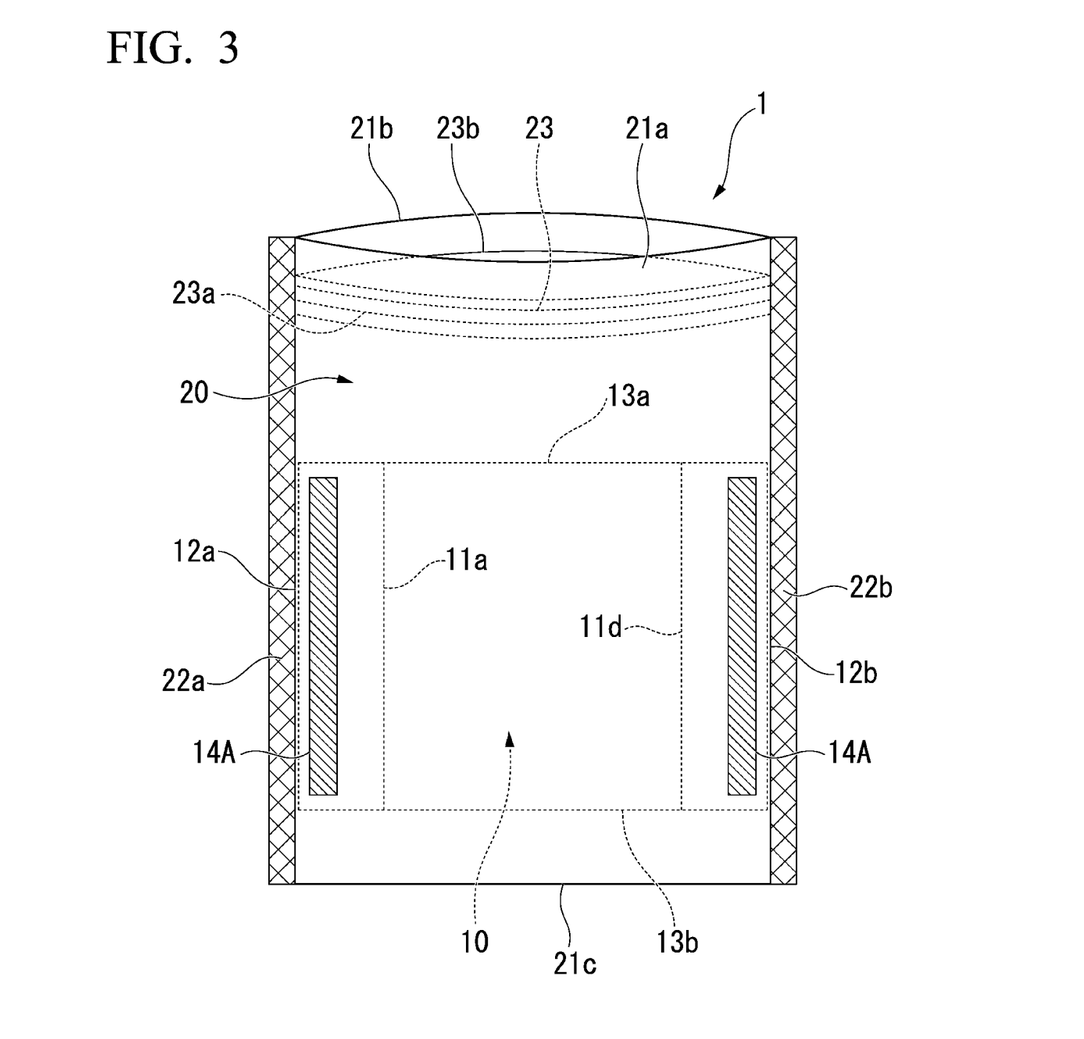
FIG. 3 is a front view showing an example of the flat state of the packaging bag of the present invention.

As shown in FIG. 3, the packaging bag 1 of this embodiment includes a bag body 20 formed as a flat bag, and a sleeve 10 provided in the bag body 20. In the state of FIG. 3, the sleeve 10 is provided in the bag body 20 in a flat state, and the packaging bag 1 is in a state of being flat overall and not having a three-dimensional shape.

The bag body 20 has a pair of facing planar parts 21a and 21b that are formed by folding a single film material into two parts and is configured such that a fold line 21c formed by folding serves as a lower end of the bag body 20. Heat seal parts 22a and 22b, in which the side ends of the respective planar parts 21a and 21b are heat-sealed and bonded along the side ends, are formed on both side ends of the bag body 20. The upper part of the bag body 20 is open, and a zipper 23, which is an engaging member for freely opening and closing an upper opening part, is attached to the upper part of the bag body 20 on the inner faces of each of the planar parts 21a and 21b.

The zipper 23 includes a belt-shaped male member 23a and a belt-shaped female member 23b which are engaged with each other. The male member 23a is provided on the inner face of the one planar part 21a to extend in a left-right direction of the bag body 20, and the female member 23b is provided on the inner face of the other planar part 3 to extend in the left-right direction of the bag body 20. Further, it is preferable that the zipper 23 has a non-continuous portion such that both the male member 23a and the female member 23b do not have the zipper 23 at a position corresponding to a portion in which a line extending from the creases 11a to 11d of the sleeve 10 intersects the zipper 23, or the thickness of at least one of the male member 23a and the female member 23b is thin.

The material of the zipper 23 may be any material that can be welded to the planar parts 21a and 21b, and examples thereof include PE and PP.

In the bag body 20 in the flat state, the sleeve 10 is provided so that the upper edge 13a of the sleeve 10 is separated downward from the upper edge of the bag body 20 by a predetermined distance, and the lower edge 13b of the sleeve 10 is separated from the lower edge of the bag body 20 by a predetermined distance. Both side ends of the sleeve 10 in a flat state, that is, the portions in which the creases 12a and 12b are formed are configured to be located at the respective edges of the heat seal parts 22a and 22b of the bag body 20 in the flat state.

The sleeve 10 in the bag body 20 is provided to be in contact with the inner faces of the respective planar parts 21a and 21b of the bag body 20, the sleeve 10 and the inner faces of the respective planar parts 21a and 21b are bonded at the bonding-scheduled pans 14a and 14b, and the bonding-scheduled parts 14a and 14b become the bonding parts 14A and 14B. Examples of the aspect of bonding the sleeve 10 to the inner face of the bag body 20 include an aspect of welding by heat sealing, an aspect of bonding by an adhesive, and so on, and an aspect of welding by heat sealing is preferable.

The film material forming the bag body 20 may be formed of a polyolefin film in which at least the inner face can be heat-sealed, may be a polyolefin film alone, and may be a laminate having a base material layer and a heat-sealing layer. The laminate may have an intermediate layer between the base material layer and the heat-sealing layer.

Examples of the polyolefin forming the polyolefin film or the heat-sealing layer include, for example, LDPE, MDPE, HDPE, LLDPE, PP and the like. As polyolefin, one type may be used alone, or two or more types may be used in combination.

Examples of the resin material forming the base material layer include, for example, paper, polyethylene terephthalate, polyamide (nylon), PP and the like. As the base material layer, a film made of one type of resin material may be used alone, or a film obtained by coextruding two or more types of resin materials may be used.

The thickness of the base material layer is preferably 6 to 50 μm.

Printing such as gravure printing and flexographic printing is usually performed on the surface of the base material layer. Printing can be performed on the outer surface side, the inner face side, or both surfaces of the base material layer.

The laminate may have an adhesive layer on the outer surface side of the bag body 20. By providing the adhesive layer, triangular parts 24b1 and 24b2 having a triangular shape to be described later can be bonded by heat sealing.

Examples of the aspect of forming the adhesive layer include an aspect of using a commercially available film having a heat-sealing layer on one side, and an aspect of printing (part-coating) a sealant on a portion to be bonded in advance.

As polyolefin forming the heat-sealing layer, the same ones as those listed as polyolefin forming the polyolefin film can be adopted.

The thickness of the heat sealing layer is preferably 6 to 50 μm.

As the intermediate layer, for example, a layer intended to improve gas barrier properties can be adopted, and specifically, a metal foil, a vapor deposition film and the like can be adopted.

The thickness of the intermediate layer is preferably 6 to 50 μm.

The packaging bag 1 can be made into a box shape from the state of the flat bag shown in FIG. 3, as shown in FIGS. 4 to 8.

Figure 4:
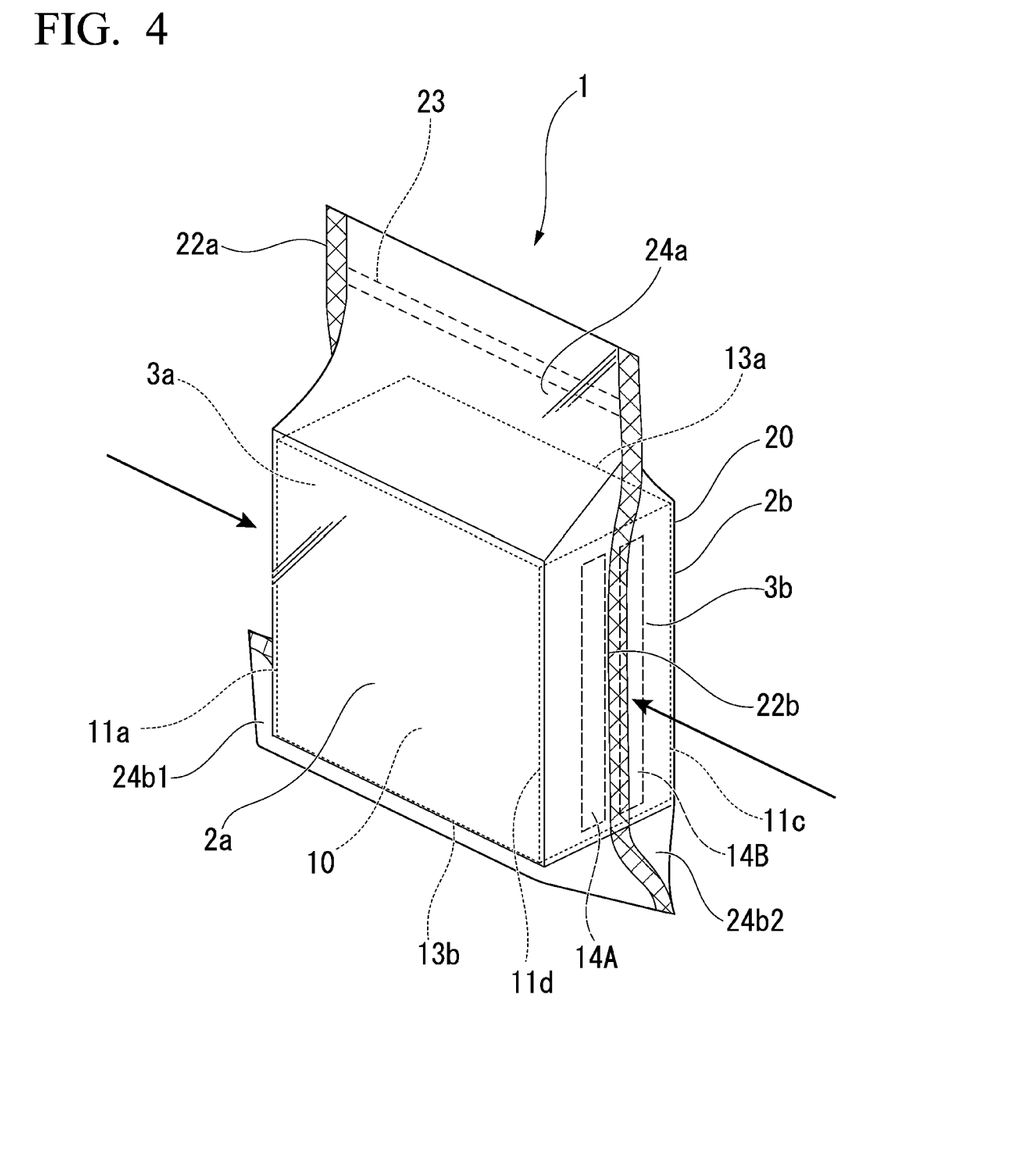
FIG. 4 is a perspective view showing an aspect in which the sleeve of the packaging bag of FIG. 3 is bent to form a rectangular tubular shape.

Specifically, as shown in FIG. 4, both sides of the packaging bag 1 are pushed inward of the packaging bag 1 and bent along the creases 11a to 11d of the sleeve 10 to make the sleeve 10 have a rectangular tubular shape. As a result, the packaging bag 1 is formed with the front face part 2a, the rear face part 2b facing the front face part 2a, and the side face parts 3a and 3b facing each other on both sides of the front face part 2a and the rear face part 2b. At this time, above the upper edge 13a of the sleeve 10 in the bag body 20, an upper part 24a having a shape in which a front view shape seen from the front face part 2a side is widened upward in the left-right direction overhangs. Further, below the lower edge 13b of the sleeve 10, a triangular part 24b1 having a triangular shape in a front view seen from the side face part 3a side overhangs on each side face part 3a side. Below the lower edge 13b of the sleeve 10, a triangular part 24b2 having a triangular shape in a front view seen from the side face part 3b side overhangs on each side face part 3b side.

Figure 5:
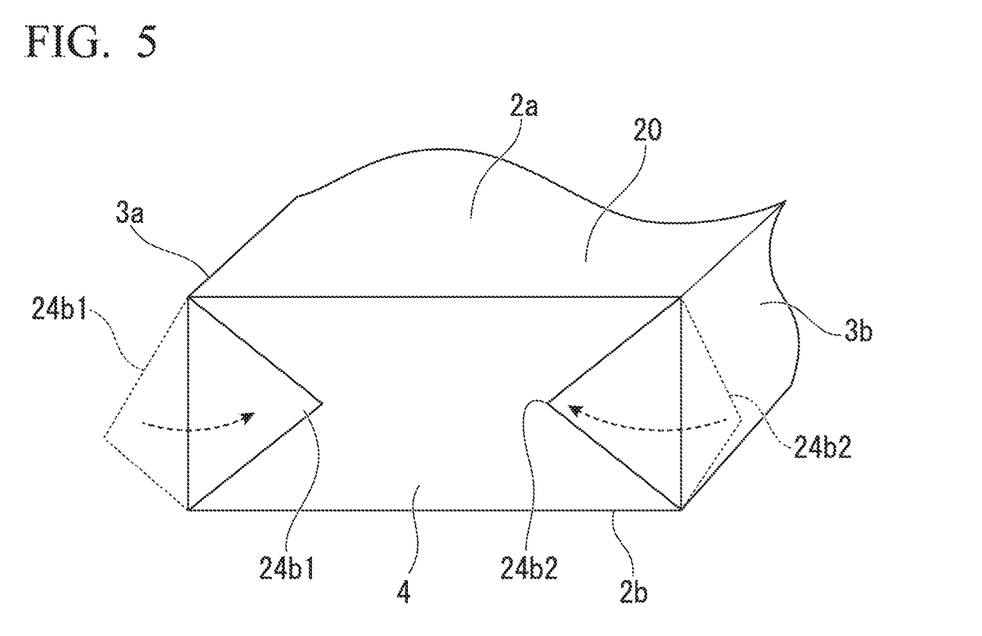
FIG. 5 is a perspective view showing an aspect in which a lower part of the packaging bag of FIG. 4 is flattened to form a bottom face part.
Figure 6:
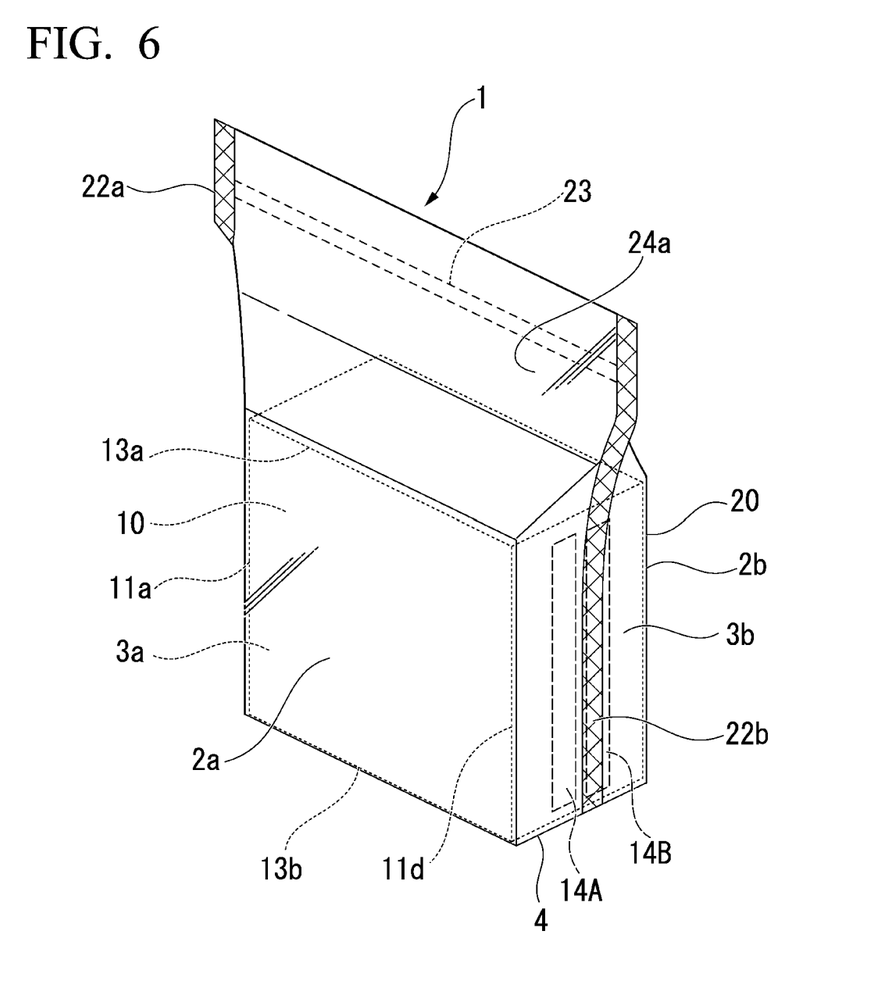
FIG. 6 is a perspective view showing the appearance of the packaging bag having the bottom face part formed thereon.

Next, as shown in FIG. 5, each of the triangular parts 24b1 and 24b2 overhanging downward from the lower edge 13b of the sleeve 10 are bent and bonded along the lower edge 13b of the sleeve 10 toward the center side of the packaging bag 1 to form a rectangular flat bottom face part 4. By forming the flat bottom surface part 4, the packaging bag 1 can stand by one self as shown in FIG. 6.

The method for bonding the triangular parts 24b1 and 24b2 having a triangular shape is not particularly limited, but includes, for example, a method for applying an adhesive (pressure sensitive adhesive) such as a hot-melt agent to that portion, a method for sticking a double-sided adhesive tape and crimping, and a part coat type for heat-sealing using a sealant previously applied to the part, a heat seal type for heat-sealing using a film having heat sealability on one side, and the like.

Figure 7:
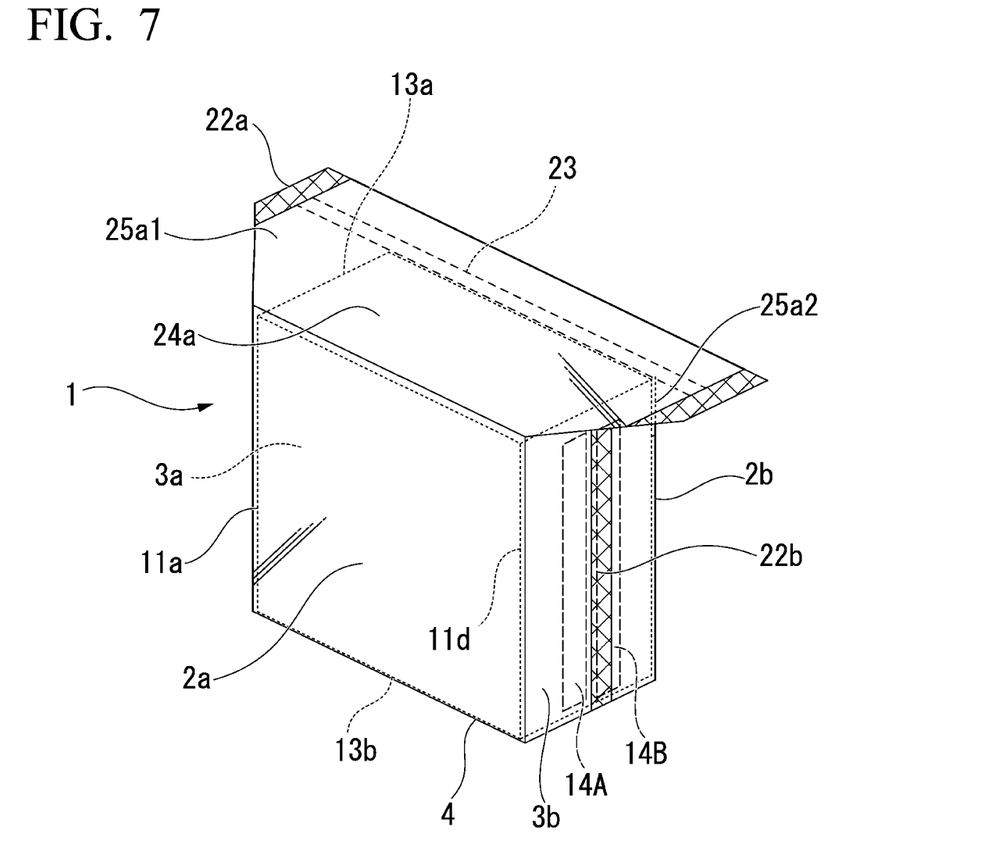
FIG. 7 is a perspective view showing an aspect in which the upper part of the packaging bag of FIG. 6 is folded to a back face side.

Next, as shown in FIG. 7, the upper part 24a overhanging upward from the upper edge 13a of the sleeve 10 is bent toward the rear face part 2b of the packaging bag 1 along the upper edge 13a of the sleeve 10 in a state in which the upper parts of the front face part 2a and the rear face part 2b overlap each other. At this time, each of the heat seal parts 22a and 22b in the bag body 20 are bent toward the rear face part 2b. On the upper part side of the bag body 20 in this state, a flat face along the upper edge 13a of the sleeve 10 is formed, and substantially triangular overhanging parts 25a1 and 25a2 that overhang toward the side face parts 3a and 3b are formed.

Figure 8:
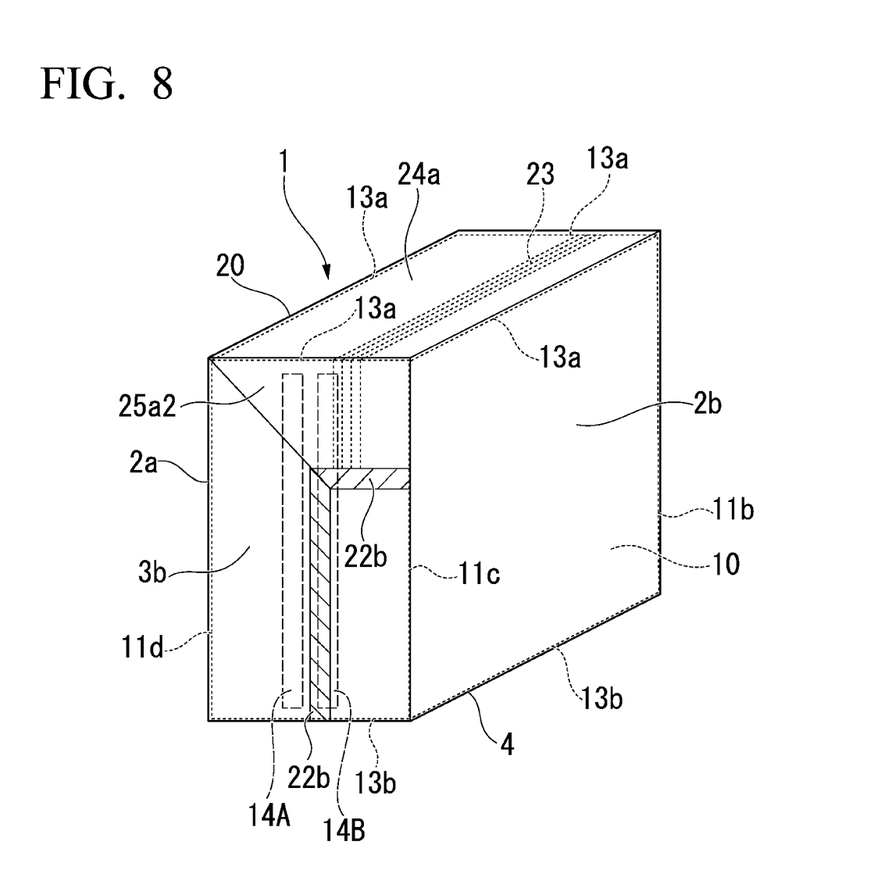
FIG. 8 is a perspective view showing a packaging bag formed in a box shape.

Next, as shown in FIG. 8, the overhanging part 25a1 is bent downward at the position of the upper edge 13a of the sleeve 10 and bonded to the side face part 3a, and the overhanging part 25a2 is bent downward at the position of the upper edge 13a of the sleeve 10 and bonded to the side face part 3b. As a result, the packaging bag 1 has a box shape. If the above-mentioned discontinuous part is formed on the zipper 23, it is easy to bend each of the overhanging parts 25a1 and 25a2 downward at the position of the upper edge 13a of the sleeve 10.

The method for bonding the overhanging parts 25a1 and 25a2 is not particularly limited, but includes, for example, a method for applying an adhesive (pressure sensitive adhesive) such as a hot-melt agent to that portion, a method for sticking a double-sided adhesive tape and crimping, a part-coat type for heat-sealing using a sealant applied to that portion in advance, a heat-sealing type for heat-sealing using a film having a heat-sealability on one side, and the like.

The height of the packaging bag 1 formed in a box shape is approximately equal to the height of the sleeve 10.

In the packaging bag 1 formed in a box shape, a front face part 2a, a rear face part 2b, and each of side face parts 3a and 3b, which are formed to be flat. Further, since the sleeve 10 is formed into a rectangular tubular shape inside the bag body 20, the film material forming the bag body 20 on each of the front face part 2a, the rear face part 2b and each of the side face parts 3a and 3b is in a state of being pulled and tensed by the sleeve 10, and the formation of wrinkles is suppressed. In particular, it is preferable that bonding parts for bonding the sleeve 10 to the inner face of the bag body 20 are provided on the respective side face parts 3a and 3b of the box-shaped packaging bag 1 that face each other, and an bonding part for bonding the sleeve 10 to the inner face of the bag body 20 is not provided at portions along the side face parts, and the four creases 11a to 11d that partition the side face parts 3a and 3b and the front face part 2a, By providing a bonding part at a portion other than the portion along the creases 11a to 11d, when the sleeve 10 is formed into a rectangular tubular shape in the bag body 20, the bag body fixed by the bonding parts provided on the side face parts 3a and 3b can freely move in the portion in which the four creases 11a to 11d are in contact with the bag body. As a result, the film material is easily pulled and tensed from the front face part 2a and the rear face part 2b of the packaging bag formed in a box shape toward the respective side face parts 3a and 3b. Even if there are wrinkles before forming the box shape, since wrinkles are eliminated, the formation of wrinkles in the box shape is suppressed. As a method for bonding the sleeve 10 and the bag body 20 to each other, a heat-sealing type or the like can be adopted. Although the positions of the bonding-scheduled parts (bonding parts) 14a and 14b are not particularly limited, as an example, it is preferable to provide the position in the vicinity of the heat seal parts 22a and 22b on the side face parts 3a and 3b. As a specific preferred example, in the example shown in FIG. 1, belt-like bonding-scheduled parts 14a and 14b starting from a position separated by a distance of within 5 mm in parallel along two creases 12a and 12b for assisting folding the sleeve 10 in a flat shape are provided to be slightly shorter than the lengths of the creases 12a and 12b.

Especially in a sleeve having a window part, it is preferable that no wrinkles are formed in the window part because the visibility of the contents is further improved.

Since the three-dimensional shape of the packaging bag 1 formed in a box shape is stably maintained by the sleeve 10, contents of a tea bag and so on can be accommodated without deforming its shape.

In the packaging bag of the present invention described above, since the three-dimensional shape is imparted at the time of use when the contents are accommodated by the sleeve of the present invention having sufficient rigidity and dead-holding property, excellent self-standing property and stacking property are ensured. Further, since the sleeve of the present invention can be made thinner than the paper sleeve and the plastic sleeve to which a filler is not added, the packaging bag of the present invention is hard to be bulky in a flat state before accommodating and using the contents, the number of packaging bags capable of being accommodated in an outer container such as a cardboard box can be increased, and the outer container that packs a predetermined number of packaging bags can be made small, the transportation efficiency is improved.

Since the dimensions of the paper sleeve easily change due to the influence of moisture in the air compared with the sleeve of the present invention to which a filler is added and the plastic sleeve to which no filler is added, in a high humidity environment, the paper sleeve expands and the packaging bag bulges, and in a low humidity environment, the paper sleeve shrinks and wrinkles are generated in the packaging bag, which easily impairs aesthetic appearance.

When wrinkles are generated in the packaging bag due to dimensional changes in the paper sleeve, wrinkles are more noticeable because the other parts of the packaging bag are smooth. In particular, since the front face design of the packaging bag is very important for users such as food manufacturers, if there are wrinkles, the packing bag is 1.5 more likely to be treated as a defective product. In this way, the paper sleeve is originally used for the purpose of forming a smooth face on the packaging bag to enhance the aesthetic appearance, but in contrast, there is a problem that the aesthetic appearance is easily impaired by a dimensional change due to moisture.

In contrast, the sleeve of the present invention to which the filler is added does not change its dimensions due to the influence of the humidity of the storage environment, and easily tensions the bag body as designed to form a wrinkle-free flat surface. Therefore, the packaging bag of the present invention has an excellent appearance and can be made to look more beautiful as a product.

Also, in the packaging bag of the present invention, the sleeve can be easily peeled off from the bag body after use.

Moreover, since the sleeve has excellent water resistance and oil resistance, packaging bag of the present invention can also be applied to the use for accommodating the contents including water and oil.

Also, depending on the local government, even in the case of a combination of a sleeve made of plastic and a packaging bag made of plastic, in some cases, it may be necessary to separate them at the time of disposal. Even in such a case, in the packaging bag of the present invention, since the filler is added to the sleeve 10, the sleeve 10 and the packaging bag can be easily separated, and thus, the packaging bag can be easily discarded. Moreover, in the packaging bag of the present invention, since the tiller is added to the sleeve, the sleeve 10 can clearly peeled off from the bag body.

The sleeve 10 has low gas permeability (in other words, high gas barrier property) as compared with a paper sleeve or a plastic sleeve to which no filler is added, and thus has good storability of the contents. A filler is added to the sleeve 10 of the present invention at a constant ratio. The addition of the filler slightly lowers the gas permeability. For example, when the packaging bag 1 including the sleeve 10 of the present invention, the packaging bag including a paper sleeve, and the packaging bag including a plastic sleeve to which no filler is added are filled with solid or powder contents, the packaging bag 1 including the sleeve 10 of the present invention has the highest storability of the contents, the packaging bag including the plastic sleeve to which no filler is added has the second highest storability, and the packaging bag including the paper sleeve has the lowest storability.

When the contents are solid or powder, since the contents do not move in the bag during the storage period, particularly in the case of a packaging bag including a paper sleeve, deterioration (oxidation and moisture absorption) of the contents progresses from the portion being in contact with the sleeve 10, and gradually progresses toward the center of the bag.

On the other hand, the sleeve of the present invention is a sheet (coating) which is formed by mixing a filler with polyolefin at a constant ratio, and in which the filler is dispersed in polyolefin in an island shape. Comparing the gas permeability between the filler-free plastic sleeve in which the molecular chains of polyolefin are entangled to form a coating shape and the sleeve of the present invention in which the filler is dispersed in the same coating in an island shape, the sleeve of the present invention has low gas permeability. That is, when the gas passes through the coating, in the sleeve of the present invention in which the filler is dispersed in an island shape, since the gas bypasses the filler when it permeates, a route for gas permeation is long, and since the amount of gas permeation per unit time is small, the gas permeability of the packaging bag 1 including the sleeve 10 of the present invention is lower than the gas permeability of the packaging bag including the plastic sleeves without filler and the gas permeability of packaging bags including the paper sleeve. As a result, in the present invention, since deterioration (oxidation and moisture absorption) of the contents can be suppressed, the storability of the contents is improved.

Further, the packaging bag of the present invention is not limited to the aforementioned packaging bag 1. For example, the packaging bag of the present invention may include the sleeve of the present invention other than the sleeve 10.

The bag body of the packaging bag of the present invention may have a tubular shape and may be a three-way seal bag or a four-way seal bag.

Also, the packaging bag of the present invention may have a structure in which the bag body is not provided with a zipper.

EXAMPLE

Hereinafter, although the present invention will be specifically described by examples, the present invention is not limited by the following description.

[Material]

The materials used in the example are shown below.

Film A: A biaxially oriented polypropylene film with a thickness of 25 µm, one surface of which is a heat-sealed face and the other surface of which is a non-heat-sealed face (corona treated face).

Film B: Linear low-density polyethylene film with a thickness of 50 µm.

Ink C: Printing ink for gravure printing.

Adhesive D: Urethane adhesive for dry lamination.

Example 1

Printing was performed on the non-heat-sealed surface (corona treated surface) of the film A, by the gravure printing method using the ink C. Next, the adhesive D was applied to the printing face of the film A, the film B was stuck by a dry lamination method, and a laminate formed by the film A (base material layer), printing layer, adhesive layer, and film B (heat-sealing layer) was obtained.

Next, the obtained laminate was half-folded so that the heat-sealing layer was on the inner face, and both side edge parts were heat-sealed to produce a three-sided bag having a height of 170 min and a width of 2.15 mm, Next, the sleeves shown in Table 1 were inserted into the three-sided bag through the opening parts, and the bonding parts shown in FIG. 1 of the sleeve and some parts of the upper and lower peripheral parts of the front and rear face parts (not shown) were heat-sealed to the inner face of the bag to obtain a packaging bag.

Examples 2 and 3, Comparative Examples 1 and 2

A packaging bag was produced in the same manner as in Example 1 except that the sleeve used was changed to that shown in Table 1.

TABLE 1

|  | TYPE OF SLEEVE | MATERIAL | DIMENSION | | | | |
|---|---|---|---|---|---|---|---|
|  |  |  | THICKNESS [µm] | L1 [mm] | L2 [mm] | L3 [mm] | L4 [mm] |
| EXAMPLE 1 | FILLER-CONTAINED PLASTIC | TALC:LDPE:PP (MASS RATIO) = 51:39:10 | 250 | 95 | 30 | 155 | 125 |
| EXAMPLE 2 | FILLER-CONTAINED PLASTIC | TALC:LDPE:PP (MASS RATIO) = 51:39:10 | 230 | | | | |
| EXAMPLE 3 | FILLER-CONTAINED PLASTIC | CALCIUMARBONAT:LDPE (MASS RATIO) = 60:40 | 250 | | | | |
| COMPARATIVE EXAMPLE 1 | PAPER | PAPER (275 g/m$^2$)/LDPE (15 µm) | 310 | | | | |

TABLE 1-continued

| TYPE OF SLEEVE | | MATERIAL | DIMENSION | | | | |
|---|---|---|---|---|---|---|---|
| | | | THICKNESS [μm] | L1 [mm] | L2 [mm] | L3 [mm] | L4 [mm] |
| COMPARATIVE EXAMPLE 2 | PLASTIC | LDPE | 500 | | | | |

A length L1 of Table 1 is a width between the creases that assist in folding the sleeve into a rectangular tubular shape, a length L2 is a width between a crease for assisting in folding the sleeve into a rectangular tubular shape and a crease for assisting in folding the sleeve in a flat shape, and L4 is a length in a height direction when the sleeve is formed into a rectangular tubular shape (FIG. 1). Further, a length L3 is a width (L3=L1±2×L2) when the sleeve is flat.

[Evaluation Method]

(1) Packing Test

A test was performed on how many flat packaging bags were placed in a cardboard box in which the outer dimensions were 470 mm (length)×230 mm (width)×190 mm (height) and the inner dimensions were 460 mm (length)×220 mm (width)×175 mm (height), and the input number was recorded.

(2) Rigidity Test

The sleeve used in each example was made into a rectangular tubular shape, and a load was applied in the height direction in a state in which the opening end on one side of the rectangular tubular shape was placed downward the sleeve was erected to measure the strength until buckling.

Table 2 shows the evaluation results.

TABLE 2

| | PACKING TEST INPUT NUMBER[SHEETS] | RIGIDITY [N] |
|---|---|---|
| EXAMPLE 1 | 505 | 140.8 |
| EXAMPLE 2 | 543 | 132.0 |
| EXAMPLE 3 | 500 | 141.5 |
| COMPARATIVE EXAMPLE 1 | 423 | 140.3 |
| COMPARATIVE EXAMPLE 2 | 277 | 145.2 |

As shown in Table 2, in Examples 1 and 2 in which the sleeve containing PP and talc was used and Example 3 in which the sleeve containing calcium carbonate was used, the number of packaging bags put in the cardboard box was large, the transportation efficiency was excellent, and rigidity sufficient to ensure self-standing property and stacking property was obtained.

On the other hand, in Comparative Example 1 using the paper sleeve, since the sleeve needs to be thick to obtain the same rigidity as the sleeves of Examples 1 to 3, the number of packaging bags put in the cardboard box was small and the transportation efficiency was inferior. Further, even in Comparative Example 2 using a plastic sleeve containing no filler, since the sleeve needs to be thick to obtain the same rigidity as the sleeves of Examples 1 to 3, the number of packaging bags put in the cardboard box was low, and the transportation efficiency was inferior.

INDUSTRIAL APPLICABILITY

The sleeve of the present invention is used for a packaging hag, has excellent water resistance and oil resistance, can ensure sufficient rigidity and dead-holding property even when it is not made excessively thick, can suppress deterioration of appearance of the packaging bag, and can be easily peeled off from the bag body after use.

The packaging bag of the present invention has sufficient self-standing property and stacking property, has an excellent appearance, and the sleeve can be easily peeled off from the bag body after use.

REFERENCE SIGNS LIST

1 Packaging bag
2a Front face part
2b Rear face part
3a, 3b Side face part
4 Bottom face part
10 Sleeve
11a to 11d First crease
12a, 12b Second crease
13a Upper edge
13b Lower edge
20 Bag body
21a, 21b Planar part
22a, 22b Heat seal part

The invention claimed is:

1. A packaging bag comprising:
a bag body,
a plastic sleeve provided in the bag body, and
a bonding part bonding the bag body and the plastic sleeve,
wherein
the plastic sleeve is configured to be deformed from a flat shape into a rectangular tubular shape such that a box shape is imparted to the bag body,
the plastic sleeve consists of polyolefin, a filler, and an additive,
a sleeve surface of the plastic sleeve includes:
  a first portion in which a first crease is formed, the first crease extending over a total length of the plastic sleeve in a height direction of the plastic sleeve when the plastic sleeve is formed in the rectangular tubular shape, and the first crease configured to form each of four corners of the plastic sleeve when the plastic sleeve is formed in the rectangular tubular shape;
  a second portion in which a second crease is formed, the second crease extending over the total length of the plastic sleeve in the height direction of the plastic sleeve when the plastic sleeve is formed in the rectangular tubular shape, and the second crease configured to form each of two corners when the plastic sleeve is formed in the flat shape; and
  a third portion other than the first portion and the second portion, the first portion and the second portion being adjacent to each other in a circumferential direction of the plastic sleeve when the plastic sleeve is formed in the rectangular tubular shape, the bonding part is provided at each of positions sandwiching the second crease in the second portion of the sleeve surface, and the first portion of the sleeve surface is provided with no bonding part bonding the bag body and the plastic sleeve.

2. The packaging bag according to claim 1, wherein a content of the filler contained in the plastic sleeve is 20% by mass or more, based on a total mass of the sleeve.

3. The packaging bag according to claim 1, wherein the filler contained in the plastic sleeve is calcium carbonate or talc.

4. The packaging bag according to claim 1, wherein polypropylene (PP) and polyethylene (PE) are used as the polyolefin used for the plastic sleeve.

5. The packaging bag according to claim 1, wherein the bonding part is provided apart from the second crease in the second portion of the sleeve surface.

6. The packaging bag according to claim 1, wherein the bonding part is formed in a belt shape, the bonding part extends parallel to the second crease, and a distance between the bonding part and the second crease is set to be within 5 mm.

* * * * *